United States Patent [19]

Bell et al.

[11] Patent Number: 5,162,902

[45] Date of Patent: Nov. 10, 1992

[54] NON-LINEAR LUMINANCE SIGNAL PROCESSOR RESPONSIVE TO AVERAGE PICTURE LEVEL (APL) OF DISPLAYED IMAGE

[75] Inventors: Isaac M. Bell; William A. Lagoni, both of Indianapolis, Ind.

[73] Assignee: Thomson Consumer Electronics, Inc., Indianapolis, Ind.

[21] Appl. No.: 808,327

[22] Filed: Dec. 16, 1991

[51] Int. Cl.$^5$ .............................................. H04N 5/57
[52] U.S. Cl. .................................... 358/168; 358/166
[58] Field of Search ............... 358/168, 169, 166, 164, 358/160

[56] References Cited

U.S. PATENT DOCUMENTS

| | | | |
|---|---|---|---|
| 4,599,643 | 7/1986 | Harlan | 358/74 |
| 4,829,381 | 5/1989 | Song et al. | 358/168 |
| 4,975,773 | 12/1990 | Rabii | 358/168 X |
| 5,003,394 | 3/1991 | Lagoni | 358/168 |
| 5,047,861 | 9/1991 | Houchin et al. | 358/168 X |

Primary Examiner—Victor R. Kostak
Attorney, Agent, or Firm—Joseph S. Tripoli; Peter M. Emanuel; Richard G. Coalter

[57] ABSTRACT

A signal processor responsive to a video input signal provides a first video output signal linearly related to the input signal and a second video output signal non-linearly related to the video input signal. A first combining circuit combines the first and second video output signals in predetermined proportions to provide a third video output signal having both linear and non-linear components. A second combining means combines the second and third video output signals in proportions determined by an average picture level (APL) representative control signal to provide a processed video output signal having enhanced contrast for all values of the average picture level of displayed images.

3 Claims, 3 Drawing Sheets

NON-LINEAR LUMINANCE SIGNAL PROCESSOR RESPONSIVE TO AVERAGE PICTURE LEVEL (APL) OF DISPLAYED IMAGE

FIELD OF THE INVENTION

This invention relates to non-linear video signal processors generally and particularly to non-linear video signal processors responsive to the average picture level (APL) of processed luminance signals for effectively enhancing the contrast of displayed images.

BACKGROUND OF THE INVENTION

In U.S. Pat. No. 5,003,394 of W. A. Lagoni, entitled "DYNAMIC VIDEO SYSTEM INCLUDING AUTOMATIC CONTRAST AND "WHITE STRETCH" PROCESSING" which issued Mar. 26, 1991, the advantages of using a "white stretch" processing section in a television system are disclosed. White-stretch processing emphasizes or boosts the amplitudes of mid-range luminance amplitudes relative to high luminance amplitudes as a function of a control signal representing the average picture level (APL) of a displayed image in order to enhance the over-all contrast of displayed images.

In allowed U.S. patent application Ser. No. 398,847 filed by W. A. Lagoni Aug. 25, 1989, and entitled AMPLIFIER ARRANGEMENT FOR PROVIDING A CONTROLLABLE NON-LINEAR TRANSFER CHARACTERISTIC USEFUL FOR IMPROVING THE CONTRAST OF AN IMAGE, there is described a specific implementation of white stretch processing suitable for use in Lagoni's patented system. In an exemplary embodiment the Lagoni white stretch processing circuitry comprises a source of luminance input signal and a source for providing a control signal representative of the average picture level (APL) of displayed images. A first circuit means responsive to the luminance input signal provides a first luminance output signal linearly related to the luminance input signal and provides a second luminance output signal non-linearly related to the luminance input signal. Means are provided for applying the first and second luminance signals to respective inputs of a "soft switch" or "blending" circuit which combines the first and second luminance signals signals in proportions determined by the APL representative control signal for providing a processed luminance output signal exhibiting greater non-linearity for smaller values of the APL control signal and exhibiting smaller non-linearity for greater values of the APL control signal. Advantageously, by this means, the Lagoni system provides enhanced contrast of displayed images.

SUMMARY OF THE INVENTION

The present invention resides in part in recognizing that, in a specific embodiment of the above-described system, the processed luminance output signal exhibits an essentially linear response to the input signal for relatively high values of the APL control signal. It has been found, in accordance with the invention, that this condition is undesirable. The visual effect of allowing the processed luminance signal to be linearly amplified for high APL values is that there is essentially no contrast enhancement for this operating condition.

The present invention is directed to counteracting the foregoing problem in such a manner as to ensure that under no circumstances will the processed video output signal exhibit a purely linear response to the video input signal in the over-all system. Advantageously, contrast enhancement is thereby provided for all values of the average picture level of displayed images.

The present invention resides, in part, in recognizing that a need exists for extending the range of automatic white stretch processing for all values of the APL representative control signal. In accordance with a second aspect of the invention, extended range white-stretch processing is achieved by circuitry that prevents the process video output signal from exhibiting an essentially linear response to the video input signal for any level of the APL representative control signal.

More specifically, video signal processing apparatus for use in a television system and embodying the invention, comprises a first source for providing a video input signal to be processed and a second source for providing a control signal representative of the average picture level (APL) of images displayed by said television system. Signal processing means, responsive to said video input signal, provides a first video output signal linearly related to said video input signal and provides a second video output signal non-linearly related to said video input signal. A first combining means combines the first and second video output signals in predetermined proportions to provide a third video output signal having both linear and non-linear components: and a second combining means combines the second and third video output signals in proportions determined by the control signal for providing a processed video output signal.

BRIEF DESCRIPTION OF THE DRAWING

The foregoing and further features of the invention are illustrated in the accompanying drawing, wherein.

DETAILED DESCRIPTION

Figure 1:
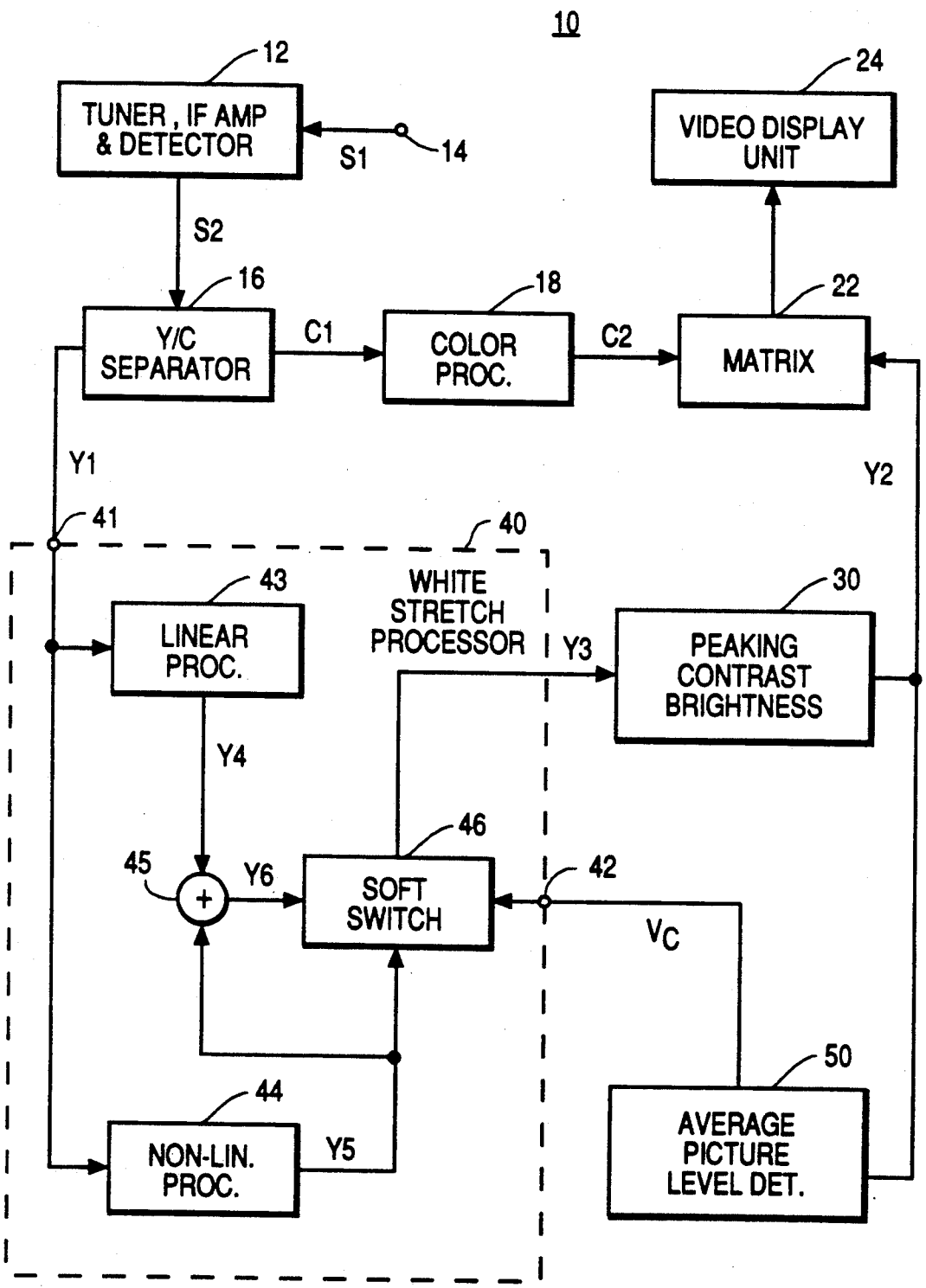
FIG. 1 is a circuit diagram of a television receiver incorporating a "white stretch" non-linear luminance signal processing apparatus embodying the invention.

The receiver 10 of FIG. 1 comprises a tuner, IF amplifier and detector unit 12 having an input 14 for receiving an RF modulated TV signal S1 and an output for providing a baseband video output signal S2 which is applied to a chrominance/luminance signal separator 16 that separates the components of signal S2 into a luminance component Y1 and a chrominance component C1. The chrominance component C1 is applied to a color processor 18 that provides conventional color processing (e.g., hue and tint control, auto-flesh tone compensation, etc.) to provide a color processed chrominance output signal C2 to one input of a matrix circuit 22. The luminance signal Y1 is applied to a "white stretch" non-linear processor 40 that provides a processed luminance output signal Y3 to a peaking, contrast and brightness control processor 30 which, in turn, provides a fully processed luminance output signal Y2 to the second input of the matrix circuit 22 which generate RGB component video signals for display by a video display unit 24. The processed luminance signal Y2 is also applied to an average picture level (APL)

detector circuit 50 which generates a white stretch control signal Vc based on the average picture level of images displayed by the video display unit 24 (e.g., a kinescope and associated driver amplifiers).

The non-linear or "white stretch" video processing unit 40 comprises a first input terminal (41) to which the video (luminance) input signal Y1 is applied for processing. A second input terminal (42) provides the control signal Vc representative of the average picture level APL of the video signals Y2 displayed by the video display unit 24. Processing unit 40 further includes a signal processing means comprising a linear processor 43 and a non-linear processor 44 an adder 45 and a "soft switch" 46. The linear processor 43 and the non-linear processor 44 comprises a signal processing means (43, 44) responsive to the video input signal Y1 for providing a first video output signal (Y4) that is linearly related to the video input signal Y1 and for providing a second video output signal (Y5) that is non-linearly related to the video input signal Y1. A first combining means, shown here as an adder 45, adds the first (Y4) and second (Y5) video signals in predetermined proportions to provide a third video output signal (Y6). A second combining means, comprising a "soft switch" 46, combines the second (Y5) and third (Y6) video output signals in proportions determined by the control signal Vc for providing a processed video output signal Y3. This video output signal Y3 is subjected to peaking, contrast and brightness control in unit 30 and supplied to matrix 22 for display on display unit 24 as previously described.

With the exception of the first combining circuit (e.g., adder 45) the system described is much the same as that described in the aforementioned Lagoni patent and allowed application (both incorporated herein by reference). The effect of this circuit, however, is to substantially alter the white stretch processing previously obtained. Recall that in the prior art white stretch processing the soft switch combined the linear and the non-linear processed signals to provide an overall transfer function that exhibited an essentially linear response for APL's (average picture levels) that were relatively high and provided increased non-linearities as the APL decreased.

In the present invention, the addition of the linear and non-linear signals in adder 45 provides a resultant signal Y6 that always has some proportion of non-linearity in it. Accordingly, when the soft switch selects the signal Y6 or Y5 (the non-linear signal) in proportion to the control signal Vc, the resultant signal Y3 always exhibits some degree of non-linearity regardless of the proportions of the selected signals. Thus, in the present invention, the luminance signal Y2 is always subjected to a minimum degree of non-linear processing regardless of the average picture level (APL) and so for any operating condition there is always at least of minimum of contrast enhancement provided.

Figure 3:
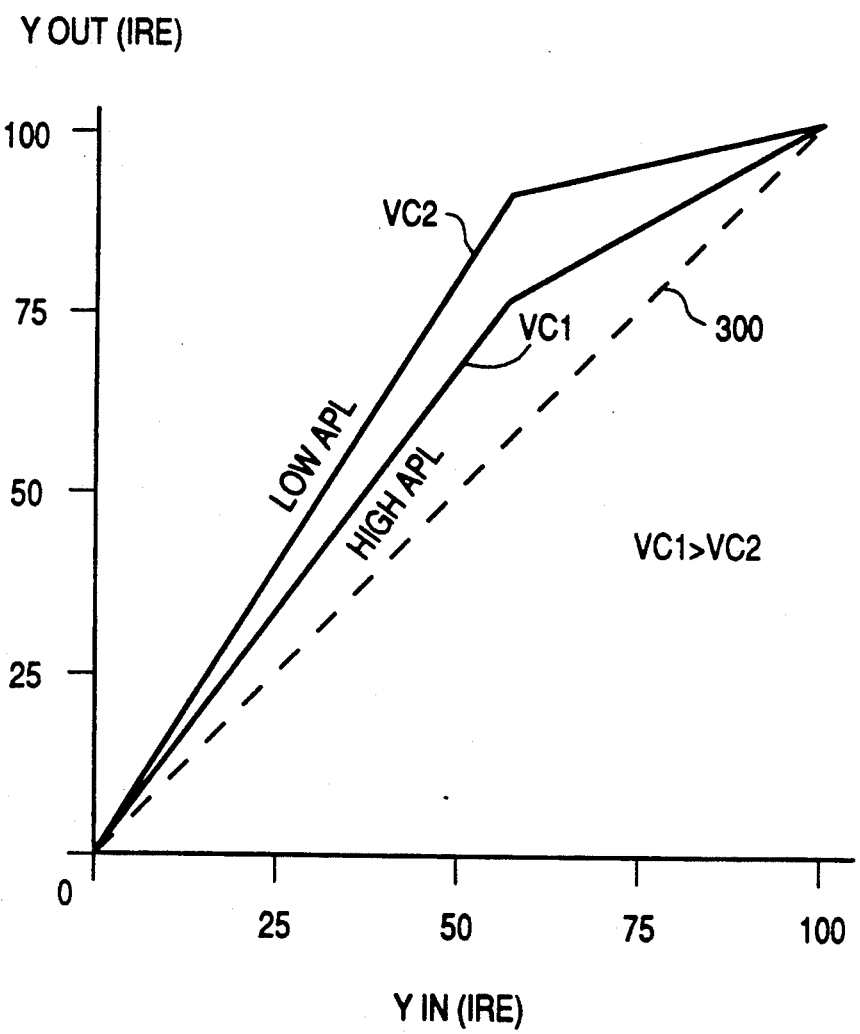
FIG. 3 is a diagram illustrating the non-linear transfer characteristics of the "white stretch" luminance non-linear signal processor of the receiver of FIG. 1.

FIG. 3 illustrates this advantageous feature of the invention. This FIGURE illustrates the input/output transfer characteristics of the non-linear (i.e., white stretch) processor 40. As shown, for a relatively low value of the control voltage VC2, representing a low average picture level, maximum non-linearity is exhibited. As the control voltage Vc increases to a higher value VC1, the non-linear characteristics decrease. At the highest value of the control voltage VC there is always some non-linearities introduced into the luminance signal transfer characteristics. Accordingly, unlike the known Lagoni system, the white stretch transfer characteristics never reach a point where the response is purely linear as illustrated by the linear response characteristic 300 (a dashed line). Advantageously, the white stretch processing of the present invention is always operative to provide contrast enhancement for mid and low level video input signals even where the average picture level is relatively high.

Figure 2:
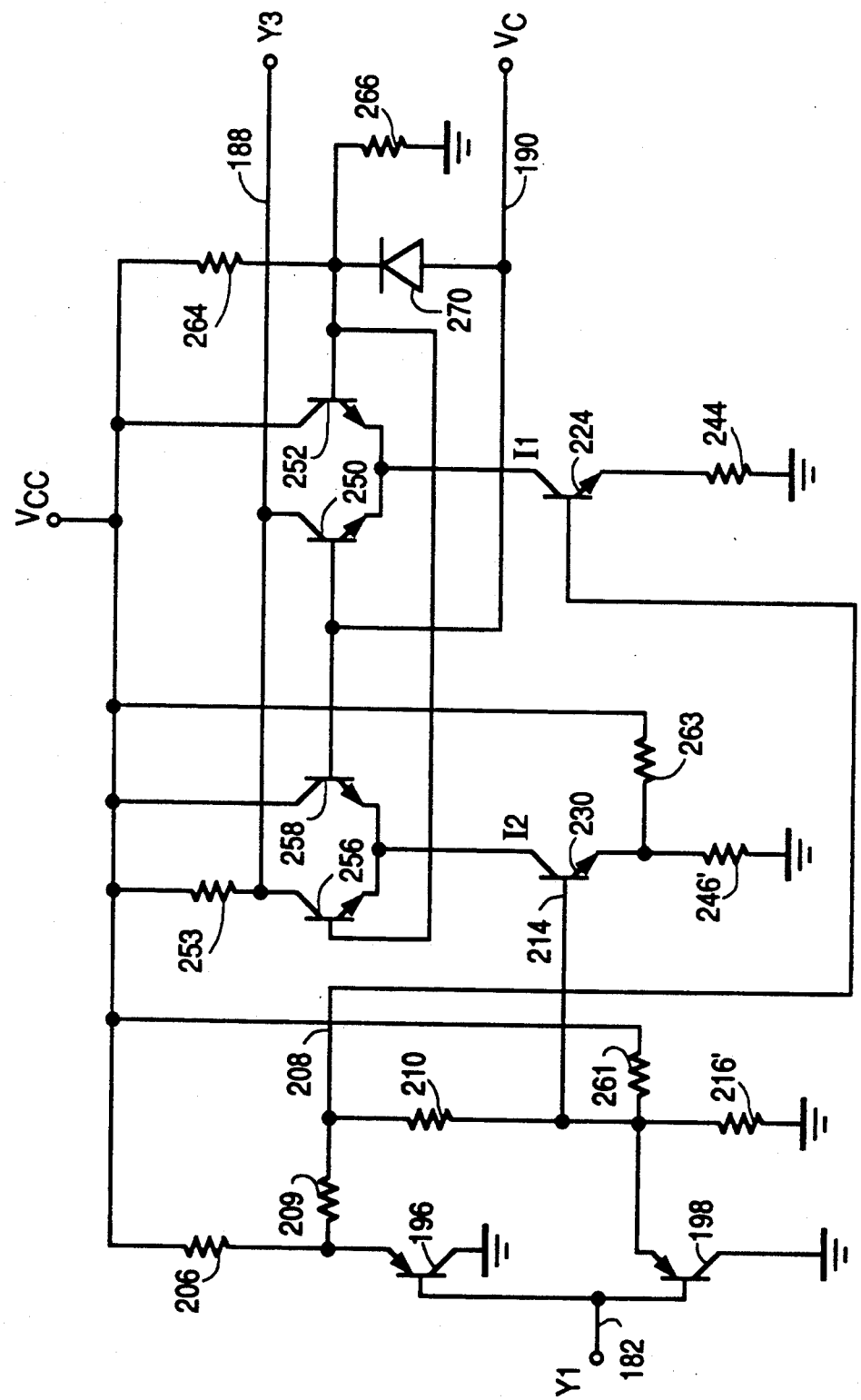
FIG. 2 is a circuit diagram illustrating details of the "white stretch" non-linear video signal processing used in the receiver of FIG. 1.

FIG. 2 is an example of an analog circuit implementation of the white stretch processor 40. It will be appreciated, of course that the circuit functions may be implemented with digital processing elements rather than analog elements. In FIG. 3 the linear processor 43 is implemented by transistor 196 and emitter resistor 206 which form a voltage (emitter) follower and so provide a linear output signal in response to the luminance input signal Y1. The non-linear processor 44 is implemented by transistor 198 and resistors 261 and 216 which bias the emitter of transistor 198 above ground. This transistor produces a non-linear response to the input signal Y1 at its emitter as follows. If Y1 is less than the potential developed by resistors 216 and 261 (less Vbe) the transistor will exhibit a linear characteristic but when the input rises to where the base emitter junction thereof is reversed biased, the transistor 198 will turn off thereby exhibiting a non-linear characteristic. The adder 45 of FIG. 1 is implemented by resistors 209 and 210 which add the linear output of transistor 196 to the non-linear output of transistor 198 and so provide a output signal Y6 that includes both linear and non-linear components.

The remaining elements comprise the soft switch 46. Specifically, the output of the adder (resistors 209 and 210) and of the non-linear amplifier (198) are applied to respective current source transistors 224 and 230 which generate proportional output currents I1 and I2. The current I1 is applied to the joined emitters of a pair of current splitter transistors 250 and 252 and the current I2 is applied to another pair of current splitter transistor 256 and 258. The bases of transistors 256 and 252 are biased by resistors 264 and 266 at a reference potential that is less than the supply voltage Vcc. The bases of transistors 258 and 250 are coupled to receive the control voltage Vc. A diode 270 limits the maximum value of Vc. An output signal is provided by coupling the collectors of transistors 256 and 250 to a common load resistor 253. Accordingly, when the control voltage Vc is relatively high, most of the output current is the linear and non-linear current I1 supplied by transistor 224. Conversely, when the control voltage Vc is relatively low, most of the output current is the non-linear current provided by transistor 230. For intermediate values of Vc, the output Y3 is in proportion to the currents I1 and I2 that is controlled by the level of the control signal Vc.

While the invention has been illustrated using analog circuit elements, it will be appreciated that the white stretch processing functions may easily be implemented using digital techniques. Other modifications will be apparent.

What is claimed is:

1. Video signal processing apparatus for use in a television system, comprising:
   a first input terminal for providing a video input signal to be processed;
   a second input terminal for providing a control signal representative of the average picture level (APL) of video signals displayed by said television system;

signal processing means responsive to said video input signal for providing a first video output signal linearly related to said video input signal and for providing a second video output signal non-linearly related to said video input signal;

first combining means for combining said first and second video output signals in predetermined proportions to provide a third video output signal having both linear and non-linear components; and second combining means for combining said second and third video output signals in proportions determined by said control signal for providing a processed video output signal.

2. Video signal processing apparatus as recited in claim 1 wherein:

said first combining means comprises adder means for adding said first and second video output signals to produce said third video output signal; and said second combining means comprises a soft switching circuit responsive to a maximum value of said control signal for selecting one of said second and third video output signals as said processed output signal, responsive to a minimum value of said control signal for selecting the other of said second and third video output signals as said processed output signal and responsive to intermediate values of said control signal for blending said second and third video output signals in proportion to the value of said control signal between said minimum and maximum values.

3. Apparatus as recited in claim 1 wherein said first combining means comprises:

a first resistor connected between an output of said first signal processing means at which said first video output signal is produced and said first input of said second signal combining means; and second resistor connected between an output of said first signal processing means at which said second video output signal is produced and said first input of said second signal combining means.

* * * * *